US006584374B2

(12) United States Patent
Lee et al.

(10) Patent No.: US 6,584,374 B2
(45) Date of Patent: Jun. 24, 2003

(54) COOKING SYSTEM AND METHOD FOR CONTROLLING THE SAME

(75) Inventors: Won-woo Lee, Ansan (KR); Young-min Hyun, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 265 days.

(21) Appl. No.: 09/805,152

(22) Filed: Mar. 14, 2001

(65) Prior Publication Data

US 2001/0027355 A1 Oct. 4, 2001

(30) Foreign Application Priority Data

Mar. 23, 2000 (KR) ........................................ 2000-14884

(51) Int. Cl.[7] ......................... G06F 19/00; G03B 21/32; F24C 7/10

(52) U.S. Cl. .......................... 700/211; 352/85; 219/386

(58) Field of Search ........................... 352/85; 700/207, 700/211; 219/391, 386; 99/323.6

(56) References Cited

U.S. PATENT DOCUMENTS 5,771,778 A * 6/1998 MacLean, IV ............. 99/323.6
5,880,434 A * 3/1999 Pinnow et al. .............. 219/386
5,949,522 A 9/1999 Manne

FOREIGN PATENT DOCUMENTS

| | | | | |
|---|---|---|---|---|
| FR | 72.08490 | * | 3/1972 | ............ A21B/1/00 |
| JP | 04-20716 | * | 1/1992 | ............ F24C/1/02 |
| JP | 9-60886 | | 3/1997 | |
| JP | 9-296931 | | 11/1997 | |
| KR | 1998-083351 | | 12/1998 | |
| KR | 1999-012890 | | 4/1999 | |

* cited by examiner

*Primary Examiner*—Leo Picard
*Assistant Examiner*—W. Russell Swindell
(74) *Attorney, Agent, or Firm*—Robert E. Bushnell, Esq.

(57) ABSTRACT

Disclosed is a cooking system comprising a cooking apparatus having a main body formed with a cooking chamber and a cooker driver cooking food within the cooking chamber; an aroma generator provided in the cooking apparatus, selectively diffusing at least one food aroma; an external unit connected to the cooking apparatus via an interface; and a controller controlling the aroma generator provided in the cooking apparatus, to allow the food aroma according to the selected cooking menu through the external unit to be diffused. With this configuration, if a cooking menu is selected through an external unit accessible to the Internet, data on the selected cooking menu is supplied to a cooking apparatus, and a food aroma and a smell remover are generated according to the selected cooking menu, thereby providing a user with complete information on a cooking menu.

37 Claims, 7 Drawing Sheets

COOKING SYSTEM AND METHOD FOR CONTROLLING THE SAME

CLAIM OF PRIORITY

This application makes reference to, incorporates the same herein, and claims all benefits accruing under 35 U.S.C. §119 from my application entitled *Cooking System And Control Method Thereof* filed with the Korean Industrial Property Office on Mar. 23, 2000 and there duly assigned Ser. No. 2000-14884.

BACKGROUND OF THE INVENTION

1. Field of the Invention

The present invention relates to a cooking system having a function of generating an If aroma, and a method for controlling the same.

2. Description of Related Art

Generally, a cooking apparatus is formed with a cooker part accommodating therein food to be cooked, and a cooker driver supplying energy required for cooking the food in the cooker part. The cooking apparatus includes, but is not limited to, a microwave oven and an electric rice cooker using electricity as a cooking energy source, and a gas range and a gas oven using gas as a cooking energy source.

FIG. 7 is a perspective view of a conventional microwave oven. As shown therein, the conventional microwave oven 101 is comprised of a main body 103 formed with a cooking chamber 105 and a component chamber 107, and an external case 109 surrounding the main body 103, defining an external appearance of the microwave oven. A door 111 opening and closing a front opening part of the cooking chamber 105 is installed in front of the cooking chamber 105. A control panel 113 having a keyboard 115 is installed adjacent to the door 111.

On the bottom of the cooking chamber 105 is mounted a tray 117 upon which food to be cooked rests. Within the component chamber 107 are housed a high voltage transformer (HVT) 119 generating a high voltage by means of an external power supply, a magnetron 123 generating electromagnetic waves by means of the high voltage generated by the HVT 119, and a fan 121 drawing outdoor air into the component chamber 107.

When a cooking menu and cooking conditions corresponding to the cooking menu are selected by a user through the keyboard 115, a controller (not shown) activates the magnetron 123 to generate the electromagnetic waves, and supplies the generated electromagnetic waves into the cooking chamber 105, thereby cooking the food placed in the cooking chamber 105.

In consideration of the tendency of many consumers preferring to a cooking apparatus having various and supplementary functions or being easy to use, a microwave oven is needed to be equipped with additional function(s) to its main function of cooking. In this regard, the microwave oven can be equipped with an aroma generating device for diffusing a variety of aromas corresponding to a selected food in order to stimulate the user's appetite while the user is waiting the food cooked. In addition, if the food aroma remained in and around the microwave oven after cooking operation can be removed, the air dispersed around and contained in the microwave oven can be maintained more pleasantly to the user. Furthermore, if an aroma good for a human being's health is generated while the microwave oven is not in operation, this would serve to improve our health.

SUMMARY OF THE INVENTION

Accordingly, the present invention has been made in view of the above-described shortcomings, and it is an object of the present invention to provide a cooking system which is capable of selecting a cooking menu externally, providing a cooking device with data on the selected cooking menu, and producing a food aroma according to the selected cooking menu, and a method for controlling the same.

This and other objects of the present invention may be achieved by a provision of a cooking system comprising a cooking apparatus having a main body formed with a cooking chamber and a cooker driver cooking food within the cooking chamber; an aroma generator provided in the cooking apparatus, selectively diffusing at least one food aroma; an external unit connected to the cooking apparatus via an interface; and a controller controlling the aroma generator provided in the cooking apparatus, to allow the food aroma according to the selected cooking menu through the external unit to be diffused.

Preferably, the cooking system further comprises a computer aroma generator producing a food aroma outside of the external unit 5, wherein the controller activates the computer aroma generator, to diffuse the food aroma according to the cooking menu selected through the external unit.

The external unit is preferably comprised of a computer system accessible to Internet.

Preferably, at least one smell remover corresponding to the food aroma is stored in the computer aroma storage unit.

Effectively, the computer aroma generator is comprised of a computer aroma storage unit storing therein a food aroma according to the cooking menu, and a computer aroma diffuser to diffuse the food aroma from the computer aroma storage unit.

Preferably, a smell remover is produced by mixture of the aroma substances stored in the computer aroma storage unit.

Effectively, the computer aroma generator is comprised of a computer aroma storage unit storing therein a plurality of aroma substances to be mixed to produce a food aroma, and a computer aroma diffuser diffusing the food aroma produced by mixture of the aroma substances.

More effectively, the computer aroma diffuser is provided with at least one computer diffusing nozzle diffusing the food aroma, and the computer aroma diffuser is provided with at least one computer diffusing nozzle diffusing the food aroma or the smell remover.

Preferably, the aroma generator is comprised of an aroma storage unit storing therein at least one food aroma, and an aroma diffuser diffusing the food aroma from the aroma storage unit.

Desirably, the aroma generator is comprised of an aroma storage unit storing therein a plurality of aroma substances to be mixed to produce a food aroma corresponding to the selected cooking menu, and an aroma diffuser diffusing the food aroma produced by mixture of the aroma substances.

At least one smell remover corresponding to the food aroma is preferably stored in the aroma storage unit, and a smell remover is produced by mixture of the aroma substances stored in the aroma storage unit.

Effectively, the aroma diffuser is comprised of at least one diffusing nozzle diffusing the food aroma.

Desirably, the diffusing nozzle diffuses the food aroma either to the outside of the main body or to the inside of the cooking chamber, and the aroma diffuser is comprised of at least one diffusing nozzle diffusing the food aroma or the smell remover.

The diffusing nozzle desirably diffuses the food aroma or the smell remover either to the outside of the main body or to the inside of the cooking chamber.

The food aroma is effectively diffused for a predetermined period of time after the cooking menu is selected.

Preferably, the smell remover is diffused when the selected cooking menu is completely cooked.

According to another aspect of the present invention, this and other objects may also be achieved by a provision of a method for controlling a cooking system including a cooking apparatus having a main body formed with a cooking chamber, and a cooker driver cooking the food accommodated within the cooking chamber, comprising the steps of connecting the cooking apparatus to an external unit through an interface; selecting a cooking menu through the external unit; and diffusing a food aroma according to a selected cooking menu to the inside or outside of the cooking apparatus.

Effectively, the method further comprises the step of diffusing the food aroma outside of the external unit.

Desirably, the food aroma is produced by mixture of a plurality of aroma substances.

Preferably, the food aroma is diffused for a predetermined period of time after the cooking menu is selected.

Preferably, the food aroma is diffused increasingly, and the food aroma is diffused intermittently.

The method desirably further comprises the step of diffusing a smell remover corresponding to the food aroma when cooking is finished.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
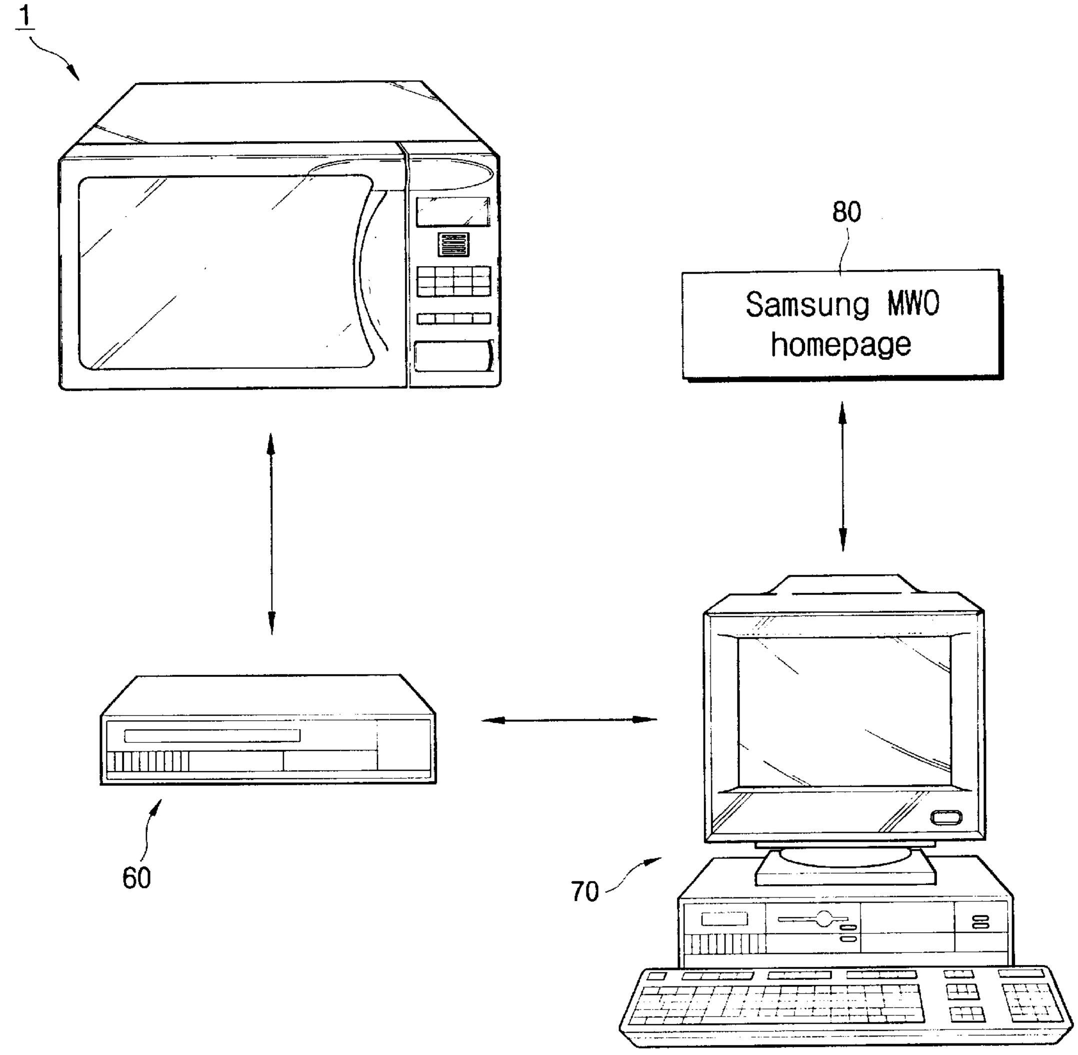
FIG. 1 is a perspective view of a cooking system according to the present invention.

Referring to FIGS. 1 through 5, a cooking system according to the present invention is comprised of a microwave oven 1 having a main body 3 (see FIG. 2) formed with a cooking chamber 5 and a magnetron 23 (see FIG. 2) generating electromagnetic waves for cooking food placed within the cooking chamber 5, the microwave oven 1 being used as a cooking device, and a computer 70 connected through an interface 60 to the microwave oven 1.

Figure 5:
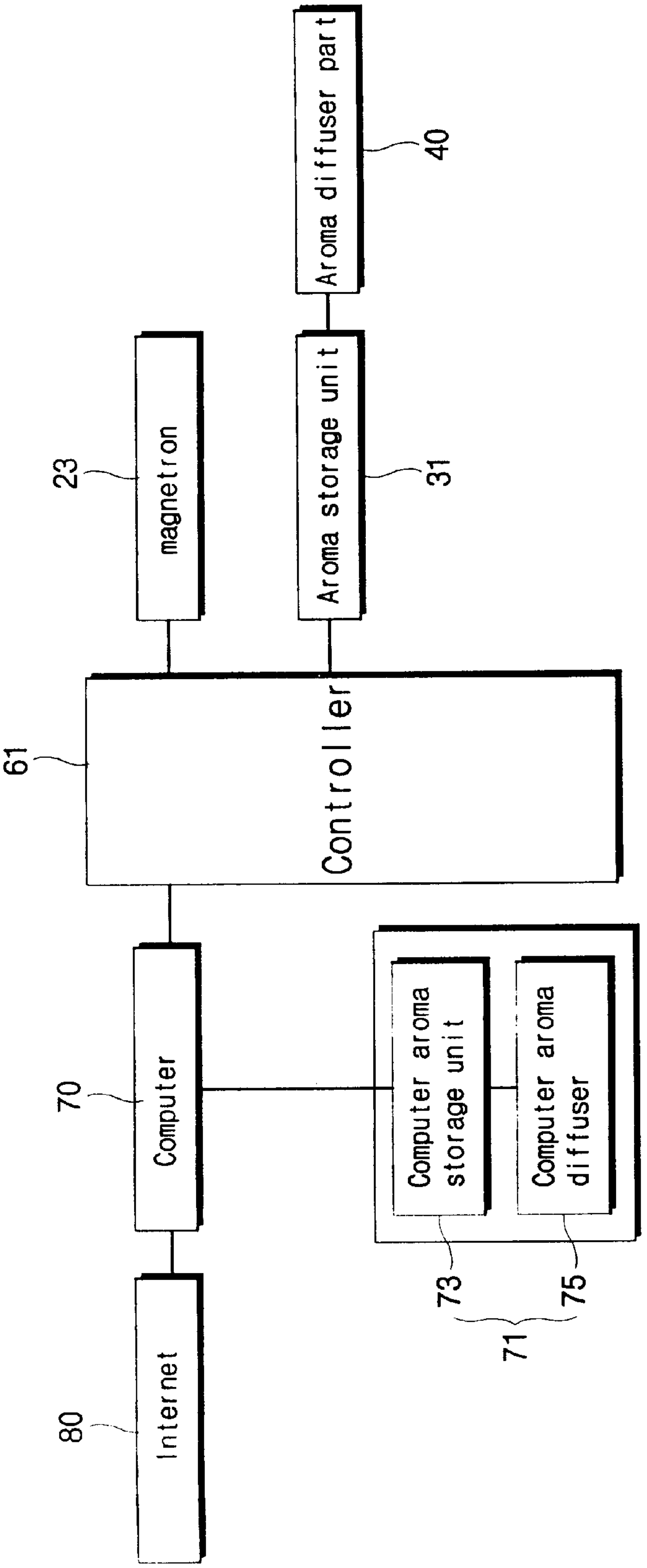
FIG. 5 is a control block diagram according to the present invention.

The computer 70 is accessible to an Internet 80 and is provided with a computer aroma generator generating an aroma corresponding to a cooking menu supplied through the Internet 80. The computer aroma generator 71 is, as shown in FIG. 5, comprised of a computer aroma storage unit 73 and a computer aroma diffuser 75. The computer aroma storage unit 73 stores therein food aromas corresponding to cooking menus, and a plurality of aroma substances which are mixed to produce respective food aromas corresponding to the cooking menus, and the computer aroma diffuser 75 diffuses the food aromas or the mixed aromas stored in the computer aroma storage unit 73.

The computer aroma generator 71 is similar in configuration and operation to an aroma generator 30 provided in the microwave oven, which will be described later.

Figure 2:
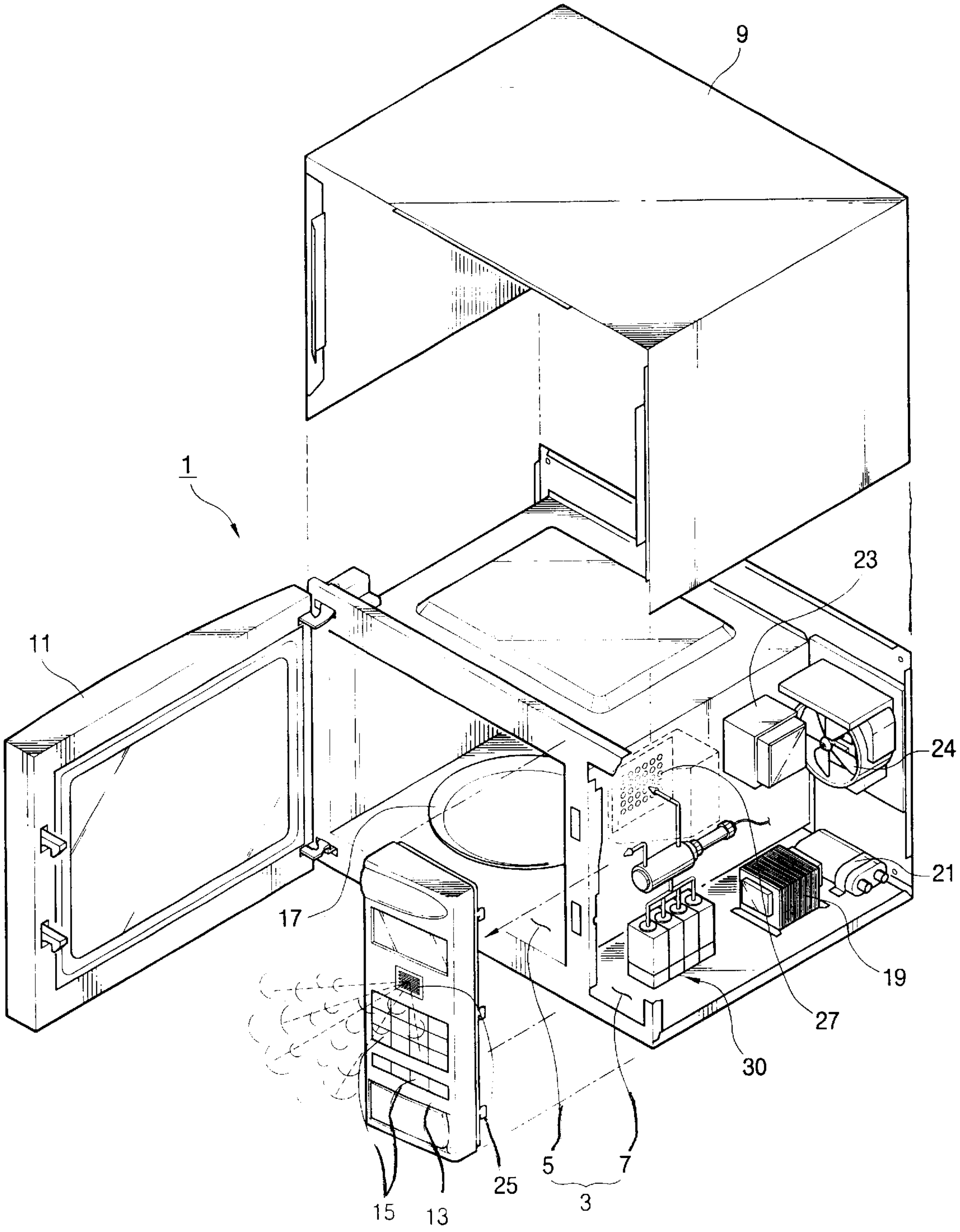
FIG. 2 is a perspective view of a microwave oven according to the present invention.

As shown in FIG. 2, the microwave oven is comprised of the main body 3 formed with the cooking chamber 5 and the component chamber 7, and a casing 9 surrounding the main body 3, defining an external appearance of the main body 3. In front of the cooking chamber 5 is installed a door 11 opening and closing a front opening part of the cooking chamber 5. A control panel 13 having a keyboard 15 is mounted adjacent to the door 11.

A tray 17 upon which food to be cooked rests is placed on the bottom of the cooking chamber 5. Within the component chamber 7 are housed a high voltage transformer (HVT) 19 generating a high voltage by means of an external power supply, a high voltage condenser (HVC) 21 storing the generated high voltage, a magnetron 23 generating electromagnetic waves by means of the high voltage generated by the HVT 19, and a fan 24 drawing outdoor air into the component chamber 7.

The aroma generator 30 is provided within the main body 3 of the microwave oven 1, the aroma generator generating food aromas and aromas to remove the food aromas or smells (that is, smell remover(s)).

Figure 3:
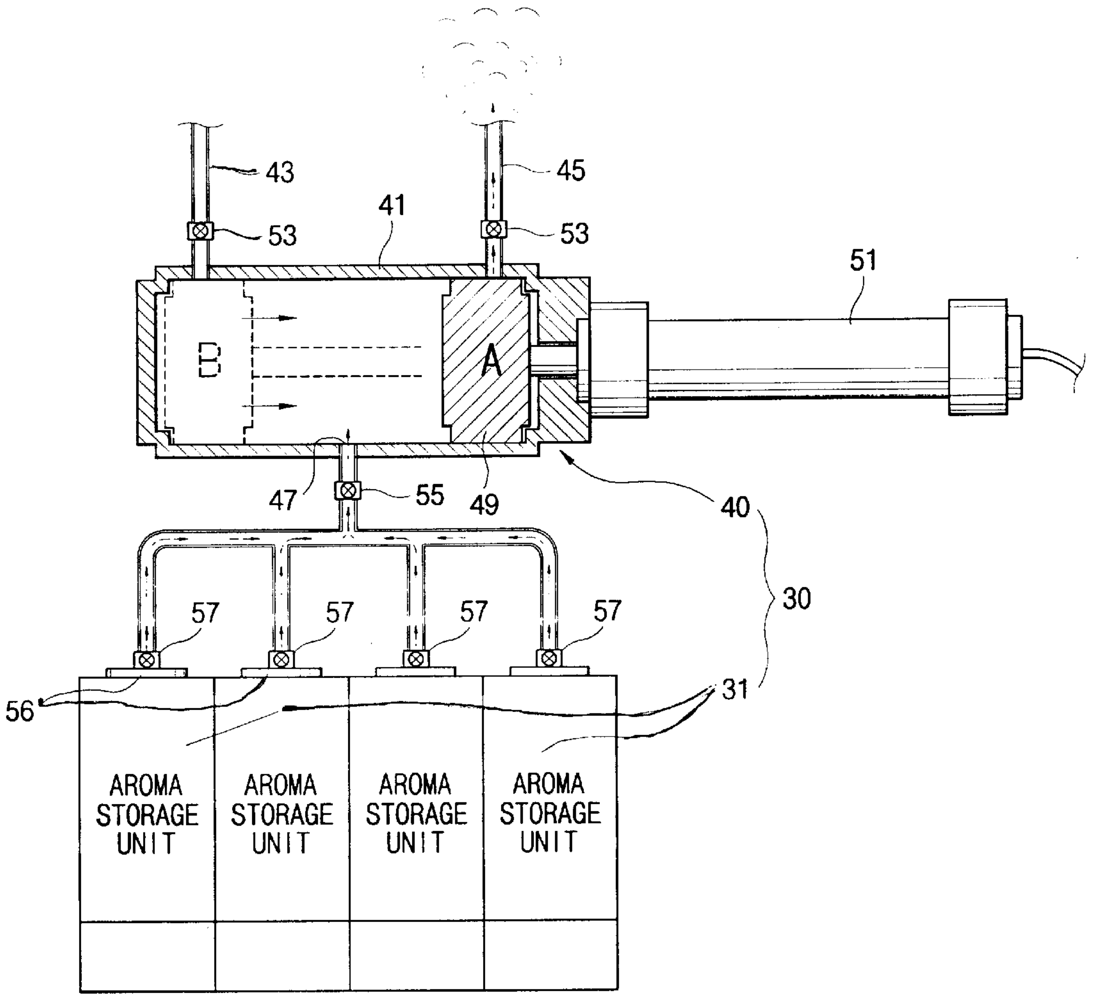
FIGS. 3 and 4 are enlarged sectional views showing operation states of an aroma diffuser device of FIG. 2.

Referring to FIG. 3, the aroma generator 30 is comprised of a plurality of aroma storage units 31 for storing a plurality of food aromas corresponding with a variety of foods to be cooked or a plurality of aroma substances in a molecular state to produce each food aroma, and an aroma diffuser 40 to diffuse the food aromas stored or produced in the aroma storage units 31. In addition, a plurality of smell removers or a plurality of aroma substances in a molecular state to produce each smell remover are stored in the aroma storage units 31. The smell remover is used to remove the food aroma or smell generated from the cooking menu or to remove the food aroma with an aroma corresponding with the food aroma.

The aroma storage units 31 contain the respective aroma substances to produce the food aromas and the smell removers therein, and each of the storage units has an outlet port 56 through which the aroma substance is discharge out. At the outlet port 56 for discharging out each aroma substance is mounted a first control valve 57 for controlling the amount of the aroma substance to be mixed depending upon the selected cooking menu. A variety of valves including a solenoid valve can be used as the first control valve 57.

The aroma diffuser 40 is comprised of an inlet port 47 connected to the aroma storage units 31, a cylinder 41 having diffusing nozzles diffusing a food aroma or a smell remover according to a selected cooking menu, and a driving means 51 activating a piston 49 accommodated in the cylinder 41. A second control valve 55 controlling the amount of a food aroma or a smell remover which is produced by combination of the aroma substances and diffused into the cylinder 41, is mounted on the inlet port 47 of the aroma diffuser 40.

The diffusing nozzles are comprised of an outside diffusing nozzle 43 and an inside diffusing nozzle 45. The outside diffusing nozzle 43 diffuses the food aroma or the smell remover according to the selected cooking menu toward the outside of the main body 3 and the inside diffusing nozzle 45 diffuses the food aroma or the smell remover into the inside of the cooking chamber 5. Nozzle control valves 53 to control the amount of the food aroma or the smell remover diffused from the cylinder 41 are installed on the diffusing nozzles 43 and 45. A variety of valves including a solenoid valve can be employed as the nozzle control valves 53.

Referring to FIG. 2, the control panel 13 has a first diffusing hole 25 formed through its planar surface, for diffusing outside the food aroma or the smell remover flowing through the outside diffusing nozzle 43. The cooking chamber 5 has also a plurality of second diffusing holes 27 formed through its sidewall, for diffusing into the cooking chamber 5 the food aroma or the smell remover flowing through the inside diffusing nozzle 45.

Figure 4:
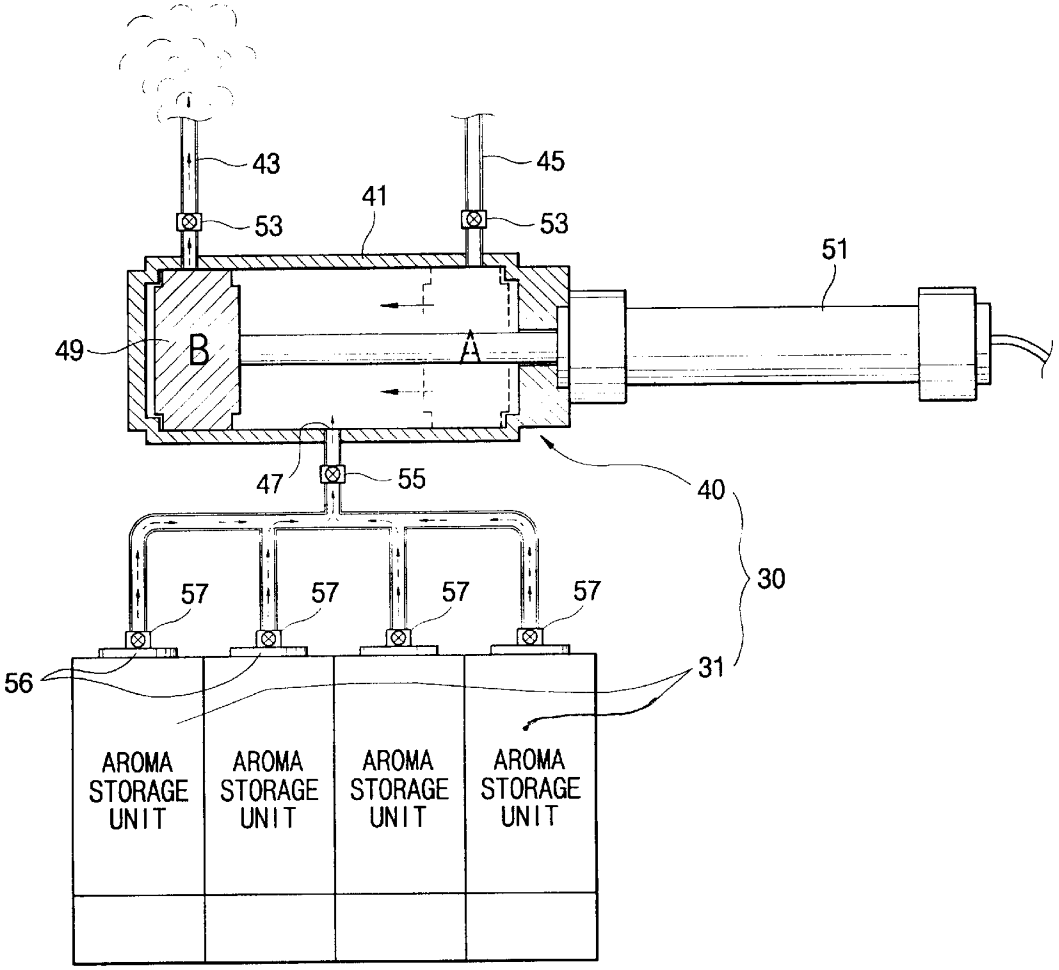

Turning to FIGS. 3 and 4, the piston 49 accommodated in the cylinder 41 reciprocates within the cylinder 41 by the driving means 51. More particularly, the piston 49 reciprocates between a first diffusing position (A) to open the inlet port 47 and the outside diffusing nozzle 43, and a second diffusing position (B) to open the inlet port 47 and the inside diffusing nozzle 45. As described above, the computer aroma generator 71, as in the aroma generator 30 provided in the microwave oven, is provided with a plurality of diffusing nozzles, to diffuse food aromas or smell removers outside and inside of the computer.

As shown in FIG. 5, the cooking system is also provided with a controller 61 transferring a data signal supplied from the computer system 70 through the Internet 80 to the microwave oven 1 through the interface 60, and activating the magnetron 23 based on the signal transferred to the microwave oven 1.

The controller 61 activates the aroma generator 30 provided in the microwave oven 1 to thereby generate a food aroma or a smell remover according to the food during cooking. According to a cooking menu selected from the computer 70, the controller 61 activates the computer aroma generator 71, to thereby diffuse a food aroma or a smell remover to the outside of the computer 70.

Figure 6:
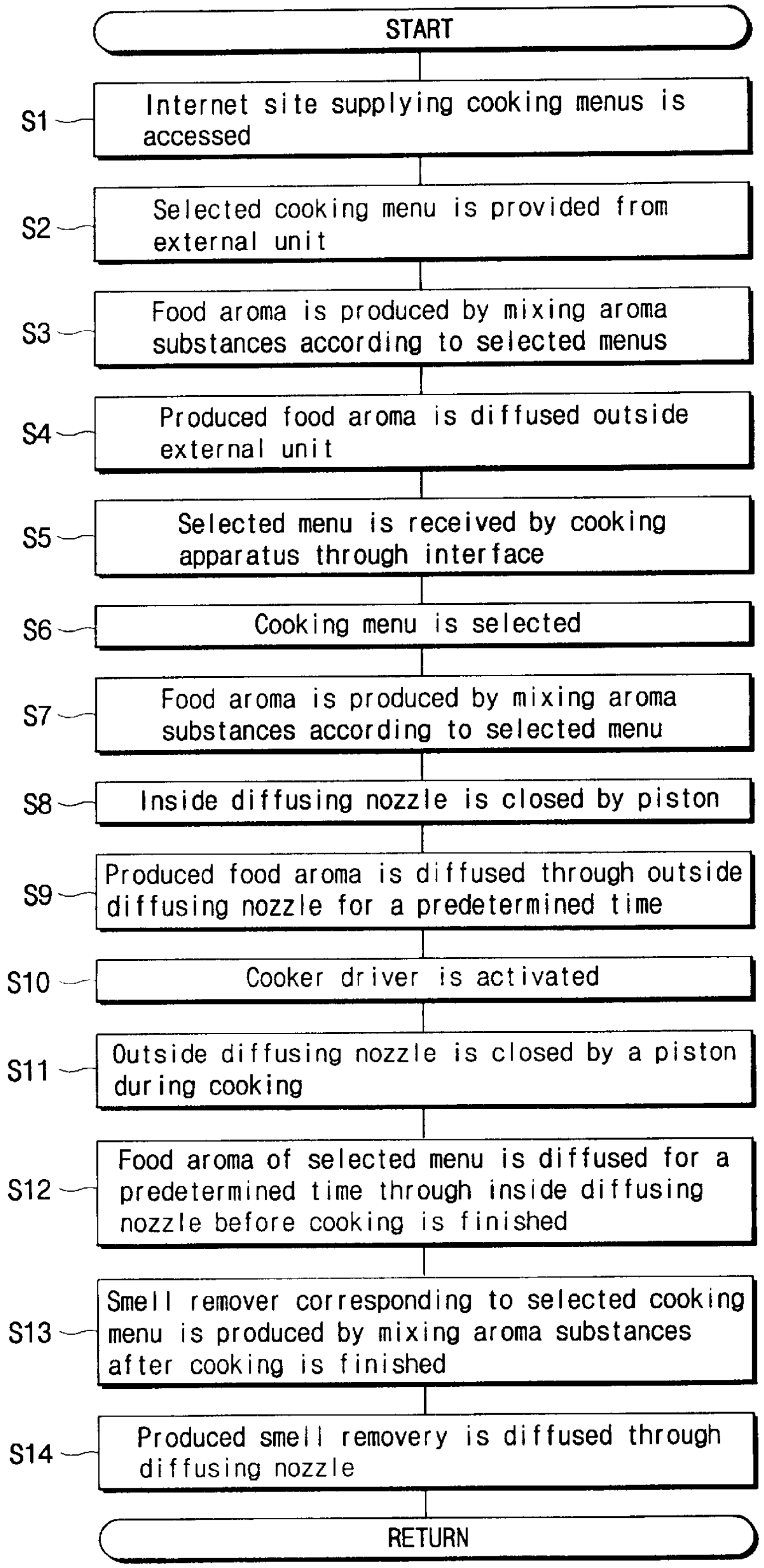
FIG. 6 is a control flow chart showing a method for controlling the cooking system according to the present invention.
Figure 7:
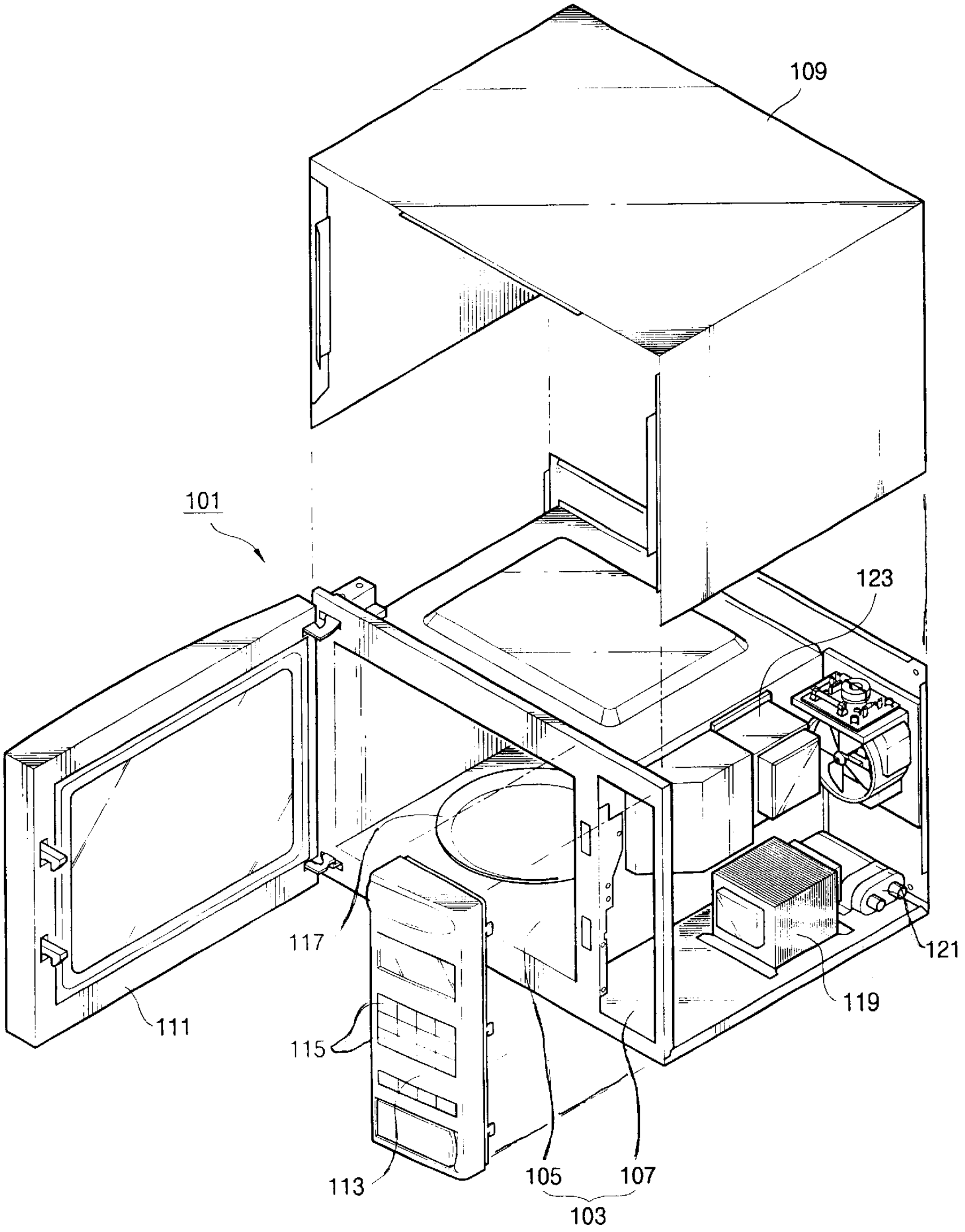
FIG. 7 (PRIOR ART)
FIG. 7 is a perspective view of a conventional microwave oven.

Referring to FIG. 6, a method for controlling a cooking system according to the present invention will be described in more detail.

As shown therein, a user first makes his or her computer system access to an Internet site supplying cooking menus to select his or her desired cooking menu (S1), and then the selected cooking menu is supplied from the Internet site (S2). The controller 61 produces a food aroma according to the selected cooking menu by appropriately mixing the aroma substances (S3), and diffuses the produced food aroma through the computer aroma generator 71 to the outside of the computer 70 (S4). At the same time, the controller 61 transfers data on the selected cooking menu to the microwave oven 1 through the interface 60 (S5). A cooking menu is selected from the microwave oven 1, based on the cooking menu data transferred to the microwave oven 1 (S6), and the controller 61 produces a food aroma according to the selected cooking menu, by mixing the aroma substances stored in the aroma storage unit 31 (S7).

If the food aroma is produced from mixture of the aroma substances, the controller 61 activates the driving means 51 to move the piston 49 of the aroma diffuser 40 to the first diffusing position A. As the piston 49 is moved to the first diffusing position A, the inside diffusing nozzle 45 is closed (S8). If the inside diffusing nozzle 45 is closed by the piston 49, the food aroma produced by mixture of the aroma substances is diffused toward the outside of the main body 3 through the outside diffusing nozzle 43 for a predetermined period of time (S9).

The controller 61 can control the outside diffusing nozzle 43 so as to allow the produced food aroma to be diffused increasingly or intermittently. The controller 61 can also control the outside diffusing nozzle 43 so as to allow the food aroma to be diffused only when the cooking menu is initially selected or when cooking for the selected cooking menu is finished.

The controller 61 activates the outside diffusing nozzle 43 to diffuse the food aroma outside and operates the magnetron 23 to cook the food in the cooking chamber (S10). While the magnetron 23 is in operation for cooking, the controller 61 drives the driving means 51 so as to allow the piston 49 of the aroma diffuser 40 to move the second diffusing position B and closes the outside diffusing nozzle 43 (S11). After the outside diffusing nozzle 43 is closed, the controller 61 activates the inside diffusing nozzle 45 to diffuse the food aroma produced according to the selected cooking menu into the cooking chamber 5 for a predetermined time (S12).

When it is determined that cooking is finished, the controller 61 produces a smell remover corresponding to the selected cooking menu by mixture of the aroma substances stored in the aroma storage units 31 (S13). The produced smell remover is diffused to the outside of the main body 3 and into the cooking chamber 5 through the outside diffusing nozzle 43 and the inside diffusing nozzle 45 (S4), respectively. Thus, the food aroma remaining inside the cooking chamber 5 and outside the main body 3 is removed.

For those users who visit an Internet cooking site with interest in cooking but cook no food by means of the microwave oven 1, the computer system according to the present invention can only conduct the steps of S1 through S5 in FIG. 6, without transferring cooking data to the microwave oven. After performing S1 through S5, a step of producing a smell remover, corresponding to the food aroma generated in the computer aroma generator 71 may be further comprised, to remove the remaining food aroma.

Where a user selects a cooking menu through the keyboard 15 provided in the microwave oven 1, instead of using the Internet 80, the steps of S6 through S12 in FIG. 6 may be only conducted. After performing S6 through S12, the steps of producing a smell remover, corresponding to the food aroma generated in the computer aroma generator 71 may be further comprised, to remove the remaining food aroma.

With this configuration, the user accesses a cooking-related site over the Internet 80 through the computer 70 and selects a cooking menu. If a cooking menu is selected, the selected cooking menu is displayed on the display of the computer system 70, and at the same time, the computer aroma generator 71 is activated to diffuse a food aroma according to the selected cooking menu to the outside of the computer 70.

When a cooking menu is selected from the computer 70, the controller 61 transfers data on the selected cooking menu to the microwave oven 1 through the interface 60 and activates the microwave oven 1 based on the transferred cooking menu data. The controller 61 can operate the aroma generator 30 formed in the microwave oven 1 to thereby diffuse the food aroma according to the selected cooking menu to the outside of the microwave oven and the inside of the cooking chamber.

The preferred embodiment of the present invention have been described with reference to a computer system. However, the present invention may also be practiced by means of cellular phones, portable display assistants (PDAs), etc. which are accessible to the Internet.

In the above-described embodiment, the smell remover is produced by mixture of the aroma substances and diffused. However, the food aroma can be removed by providing a deodorizing filter to deodorize the remaining food aroma and a fan blowing the food aroma toward the deodorizing filter.

The diffusing nozzles 43 and/or 45 can be rotatably provided to adjust diffusing directions of the food aroma and the smell remover. Alternatively, a food aroma diffusing nozzle to diffuse the food aroma and a smell remover diffusing nozzle to diffuse a smell remover can be separately provided.

Further, an aroma to maintain the inside of a cooking chamber with a fresh air can be produced by mixing the aroma substances stored in the aroma storage unit 31; or the aroma can be directly stored in the aroma storage unit 31.

As described above, according to the present invention, there is provided a cooking system capable of selecting a cooking menu through a computer accessed to the Internet, supplying data on the selected cooking menu to a cooking apparatus such as a microwave oven, and generating a food aroma and a smell remover according to the selected cooking menu.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooking system comprising:

a cooking apparatus having a main body formed with a cooking chamber and a cooker driver cooking food within the cooking chamber;

an aroma generator provided in the cooking apparatus, selectively diffusing at least one food aroma;

an external unit connected to the cooking apparatus via an interface; and a controller controlling the aroma generator provided in the cooking apparatus, to allow the food aroma according to a selected cooking menu through the external unit to be diffused.

2. The cooking system according to claim 1, further comprising a computer aroma generator producing a food aroma outside of the external unit, wherein the controller activates the computer aroma generator, to diffuse the food aroma according to the cooking menu selected through the external unit.

3. The cooking system according to claim 2, wherein the external unit is comprised of a computer system accessible to Internet.

4. The cooking apparatus according to claim 2, wherein the computer aroma generator is comprised of a computer aroma storage unit storing therein a food aroma according to the cooking menu, and a computer aroma diffuser to diffuse the food aroma from the computer aroma storage unit.

5. The cooking system according to claim 4, wherein at least one smell remover corresponding with the food aroma is stored in the computer aroma storage unit.

6. The cooking system according to claim 2, wherein the computer aroma generator is comprised of a computer aroma storage unit storing therein a plurality of aroma substances to be mixed to produce a food aroma, and a computer aroma diffuser diffusing the food aroma produced by mixture of the aroma substances.

7. The cooking system according to claim 6, wherein a smell remover is produced by mixture of the aroma substances stored in the computer aroma storage unit.

8. The cooking system according to claim 4, wherein the computer aroma diffuser is provided with at least one computer diffusing nozzle diffusing the food aroma.

9. The cooking system according to claim 6, wherein the computer aroma diffuser is provided with at least one computer diffusing nozzle diffusing the food aroma.

10. The cooking system according to claim 5, wherein the computer aroma diffuser is provided with at least one computer diffusing nozzle diffusing the food aroma or the smell remover.

11. The cooking system according to claim 7, wherein the computer aroma diffuser is provided with at least one computer diffusing nozzle diffusing the food aroma or the smell remover.

12. The cooking system according to claim 1, wherein the aroma generator is comprised of an aroma storage unit storing therein at least one food aroma, and an aroma diffuser diffusing the food aroma from the aroma storage unit.

13. The cooking system according to claim 11, wherein at least one smell remover corresponding to the food aroma is stored in the aroma storage unit.

14. The cooking system according to claim 1, wherein the aroma generator is comprised of an aroma storage unit storing therein a plurality of aroma substances to be mixed to produce a food aroma corresponding with the selected cooking menu, and an aroma diffuser diffusing the food aroma produced by mixture of the aroma substances.

15. The cooking system according to claim 14, wherein a smell remover is produced by mixture of the aroma substances stored in the aroma storage unit.

16. The cooking system according to claim 10, wherein the aroma diffuser is comprised of at least one diffusing nozzle diffusing the food aroma.

17. The cooking system according to claim 16, wherein the diffusing nozzle diffuses the food aroma either to the outside of the main body or to the inside of the cooking chamber.

18. The cooking system according to claim 12, wherein the aroma diffuser is comprised of at least one diffusing nozzle diffusing the food aroma.

19. The cooking system according to claim 18, wherein the diffusing nozzle diffuses the food aroma either to the outside of the main body or to the inside of the cooking chamber.

20. The cooking system according to claim 11, the aroma diffuser is comprised of at least one diffusing nozzle diffusing the food aroma or the smell remover.

21. The cooking system according to claim 20, wherein the diffusing nozzle diffuses the food aroma or the smell remover either to the outside of the main body or to the inside of the cooking chamber.

22. The cooking system according to claim 13, the aroma diffuser is comprised of at least one diffusing nozzle diffusing the food aroma or the smell remover.

23. The cooking system according to claim 22, wherein the diffusing nozzle diffuses the food aroma or the smell remover either to the outside of the main body or to the inside of the cooking chamber.

24. The cooking system according to claim 10, wherein the food aroma is diffused for a predetermined period of time after the cooking menu is selected.

25. The cooking system according to claim 12, wherein the food aroma is diffused for a predetermined period of time after the cooking menu is selected.

26. The cooking system according to claim 11, wherein the smell remover is diffused when the selected cooking menu is completely cooked.

27. The cooking system according to claim 13, wherein the smell remover is diffused when the selected cooking menu is completely cooked.

28. A method for controlling a cooking system including a cooking apparatus having a main body formed with a cooking chamber, and a cooker driver cooking the food accommodated within the cooking chamber, comprising the steps of:

connecting the cooking apparatus to an external unit through an interface;

selecting a cooking menu through the external unit; and diffusing a food aroma according to a selected cooking menu to the inside or outside of the cooking apparatus.

29. The method according to claim 28, further comprising the step of diffusing the food aroma outside of the external unit.

30. The method according to claim 28, wherein the food aroma is produced by mixture of a plurality of aroma substances.

31. The method according to claim 29, wherein the food aroma is produced by mixture of a plurality of aroma substances.

32. The method according to claim 28, wherein the food aroma is diffused for a predetermined period of time after the cooking menu is selected.

33. The method according to claim 29, wherein the food aroma is diffused for a predetermined period of time after the cooking menu is selected.

34. The method according to claim 28, wherein the food aroma is diffused increasingly.

35. The method according to claim 28, wherein the food aroma is diffused intermittently.

36. The method according to claim 28, further comprising the step of diffusing a smell remover corresponding with the food aroma when cooking is finished.

37. The method according to claim 29, further comprising the step of diffusing a smell remover corresponding with the food aroma when cooking is finished.

* * * * *